May 19, 1931. G. FLINTERMANN 1,806,014
ADJUSTABLE SEAT FOR VEHICLES
Filed Jan. 7, 1929 5 Sheets-Sheet 1
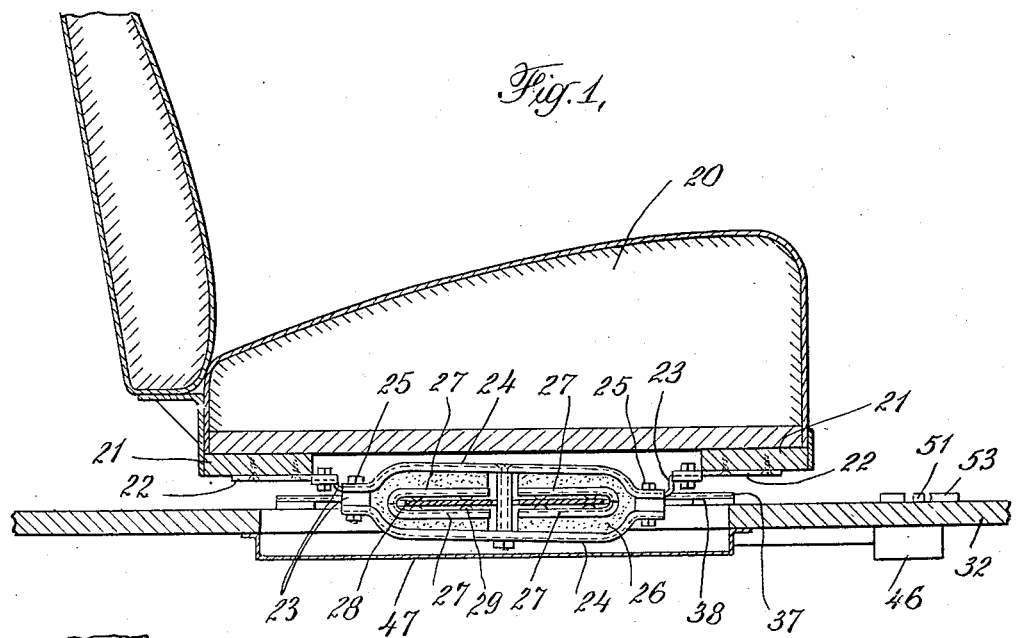
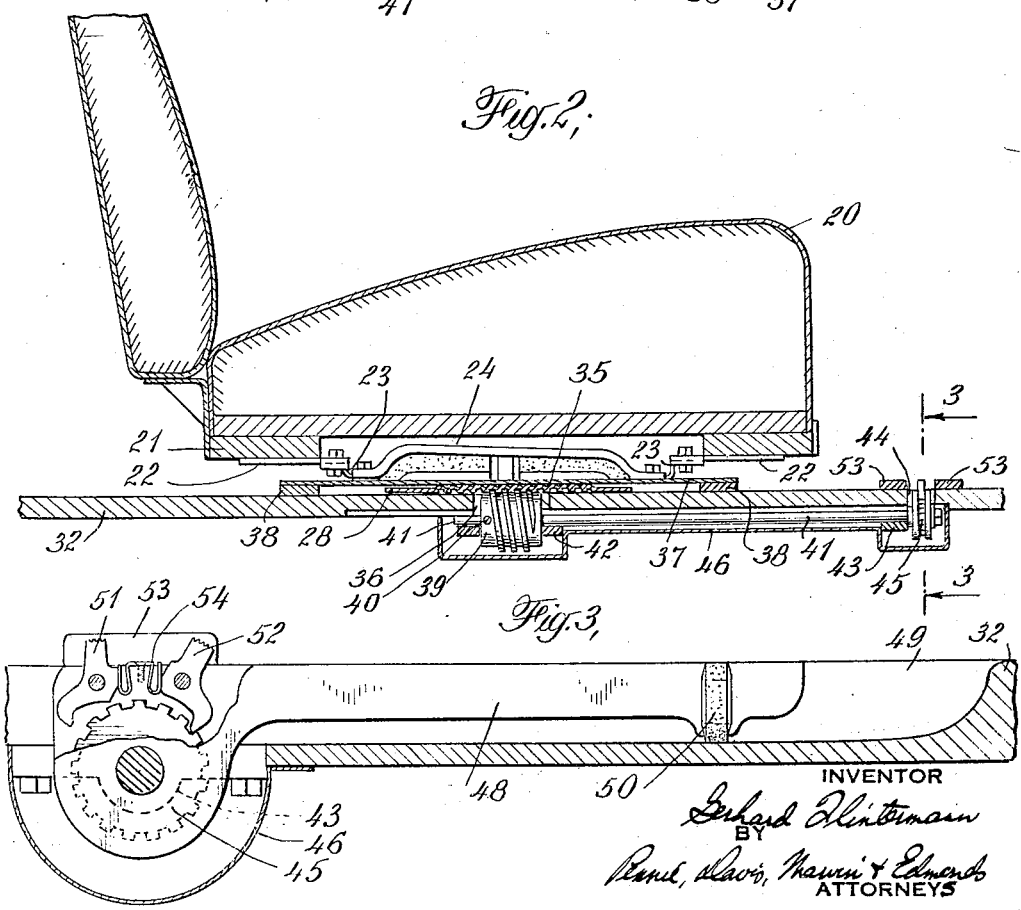

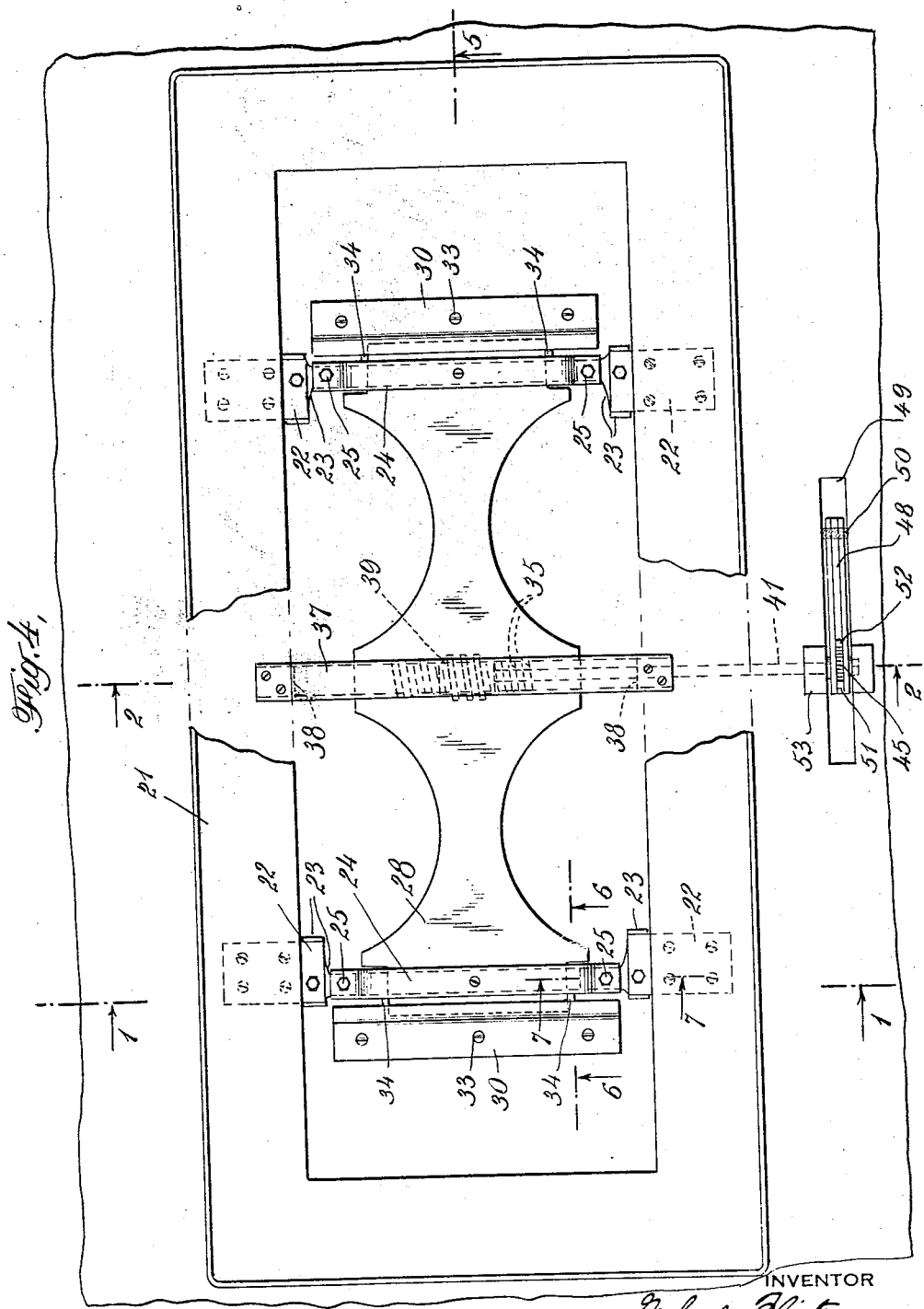

May 19, 1931. G. FLINTERMANN 1,806,014
ADJUSTABLE SEAT FOR VEHICLES
Filed Jan. 7, 1929 5 Sheets-Sheet 3
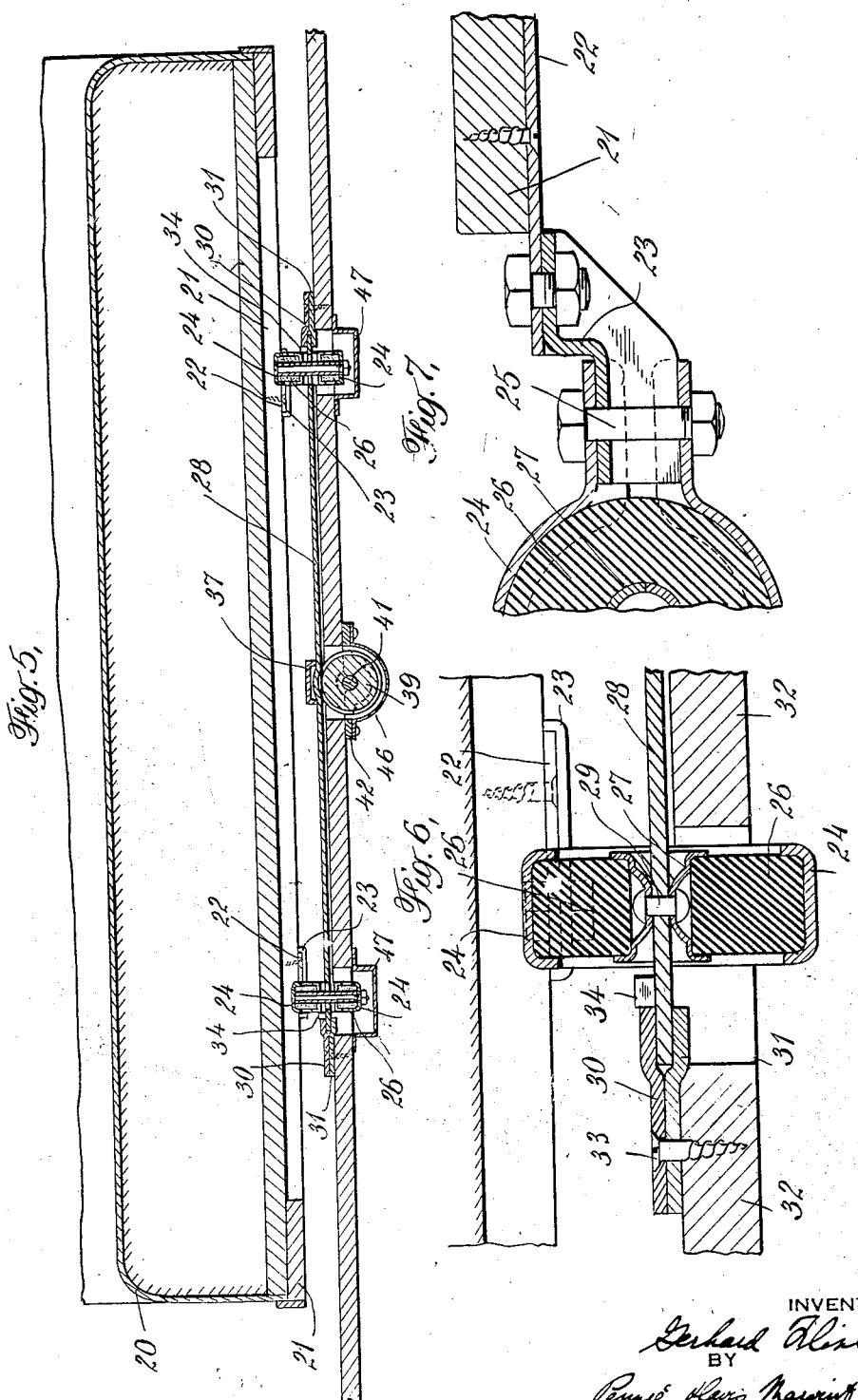
INVENTOR
Gerhard Flintermann
BY
Pennie, Davis, Marvin & Edmonds
ATTORNEYS May 19, 1931. G. FLINTERMANN 1,806,014
ADJUSTABLE SEAT FOR VEHICLES
Filed Jan. 7, 1929 5 Sheets-Sheet 4
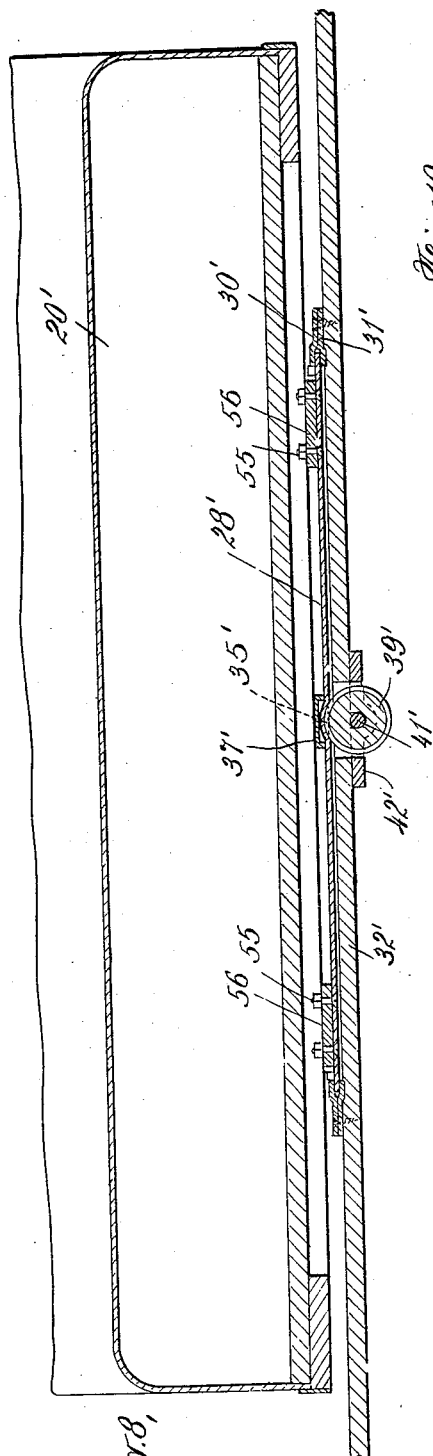
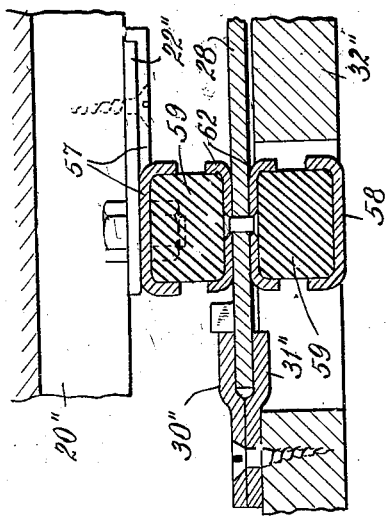
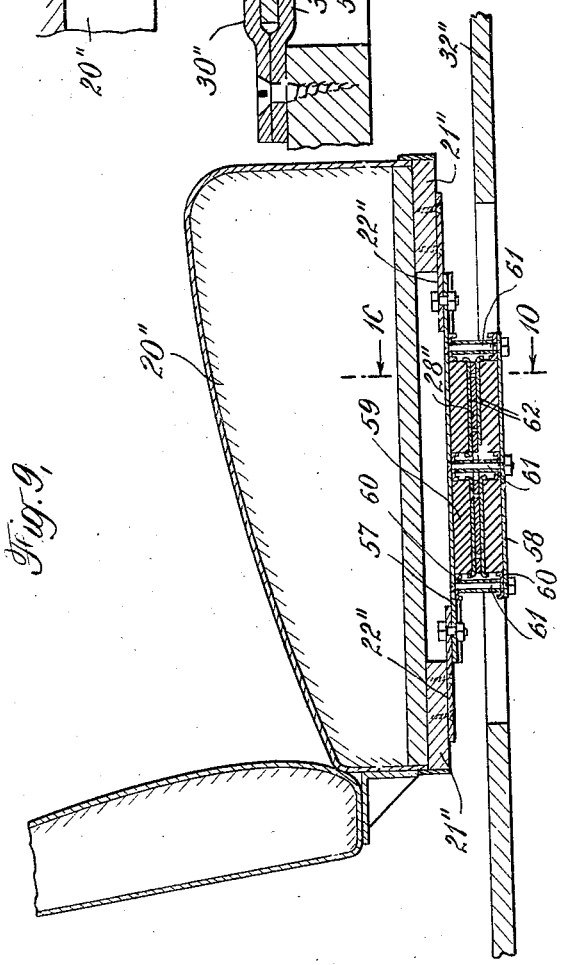
INVENTOR
Gerhard Flinterman
BY
Pennie, Davis, Marvin & Edmonds
ATTORNEYS

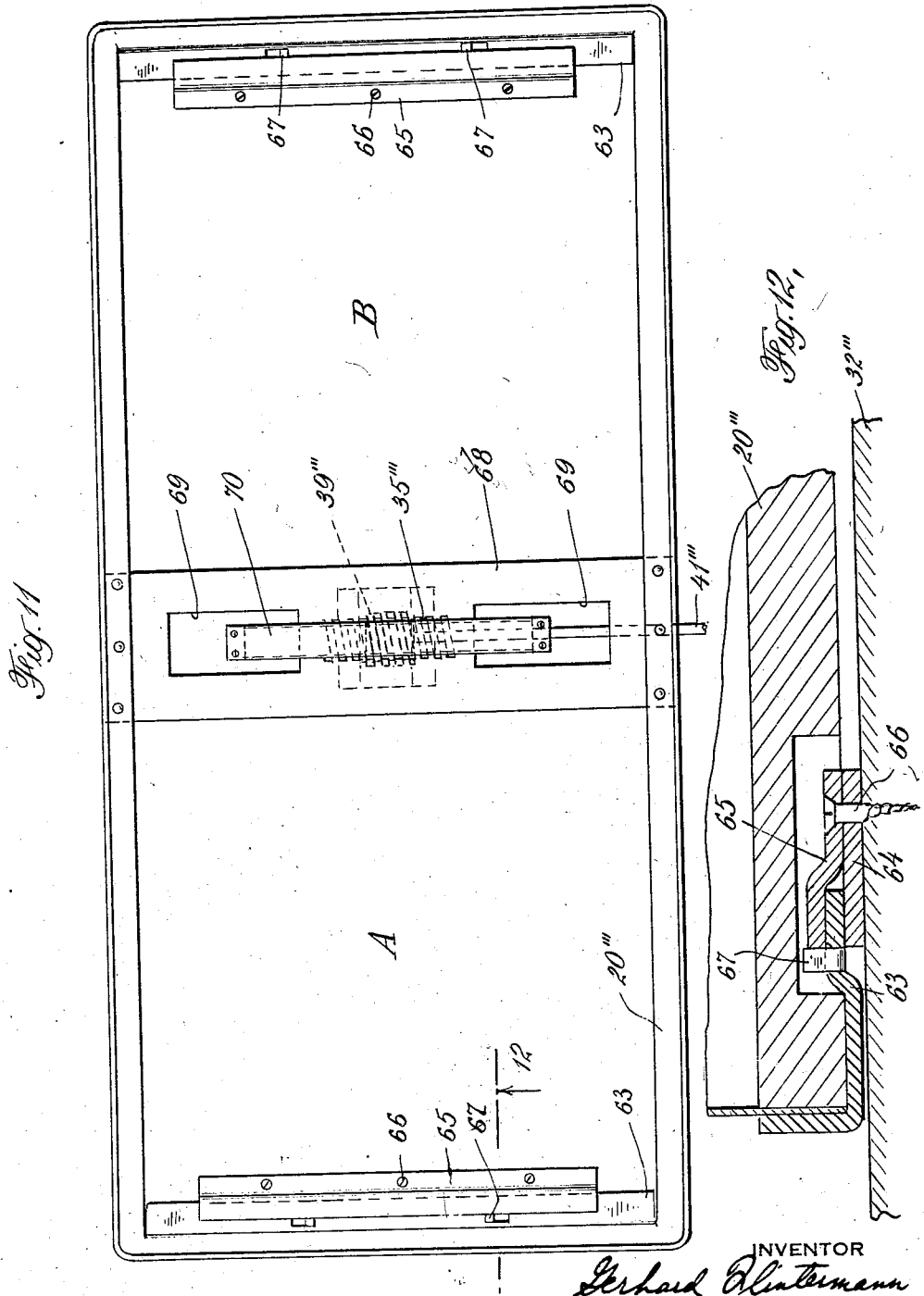

Patented May 19, 1931

1,806,014

UNITED STATES PATENT OFFICE

GERHARD FLINTERMANN, OF ORANGE, NEW JERSEY

ADJUSTABLE SEAT FOR VEHICLES

Application filed January 7, 1929. Serial No. 330,719.

This invention relates to adjustable seats and has particular reference to vehicle seats which are adjustable forward and backward to suit the convenience of the occupant, particularly the driver of an automobile who must operate certain foot pedals and to whom the proper amount of leg room is an important factor for comfort and driving facility. Automobile seats are usually installed permanently. That is, their relation to the floor boards, foot pedals and other portions of the vehicle remains fixed at all times so that no consideration is given to the size of the occupant or operator and discomfort frequently results as well as difficulty in properly operating the foot pedals and the like. Attempts have been made to make automobile seats adjustable by providing a series of bolt holes in the floor boards for the variable insertion of the seat holding bolts and the like, but these required the services of a skilled operator, involved a great deal of expensive mechanism and frequently interfered with other parts of the vehicle. One reason why automobile seats have not been made adjustable heretofore was because the backs of the seats were principally supported on beams extending between opposite sides of the automobile body, door frames and the like. At the present time, however, front seats of vehicles are emplaced as separate, self-supporting units and in certain types of vehicles, at least one of the front seats is made folding and is hinged to the floor to permit partial displacement for allowing passage room for the occupants in entering and leaving the vehicle.

It is the principal object of this invention to provide a seat for vehicles which is adjustable forward and backward to suit the requirements of the occupant, the seat being so arranged as to be adjustable by the user himself without requiring special skill or strength. Another object of the invention is to include between the seat and its support flexible joints which permit a slight relative movement of the seat with respect to the vehicle, this movement being provided by one or more resilient bodies such as soft rubber blocks. These resilient bodies of soft rubber accordingly absorb small shocks and vibrations set up by the engine and the like and by irregularities in the road surface, and also permit a slight additional adjustment of the seat to suit the comfort of the occupant. A further object of the invention is to arrange the component parts of the seat in such a way that the seat is only slightly raised above the surface of the floor to accommodate the supporting means, including the resilient joints above-mentioned, whereby the seat may be installed with facility upon vehicle bodies which are underslung or otherwise built close to the ground without impairing or interfering with the low built features of the vehicle as a whole or interfering with the operator's vision.

These objects and others are attained in the preferred embodiment of the invention by making all metal parts of pressed steel which secures lightness, strength and requires a minimum amount of space. The seat is preferably mounted entirely upon a thin sheet-metal plate lying directly above the surface of the floor, at least two opposite edges of which are mounted for sliding movement in longitudinal guides arranged longitudinally of the vehicle and preferably mounted directly upon the floor.

Interposed between the seat and this plate are soft rubber blocks which absorb shocks and vibrations and permit limited movement of the seat relatively to the plate. The under side of the plate is provided with a longitudinal rack preferably pressed into the plate, this rack being located over an opening in the floor. Mounted in this opening in the floor and journalled upon suitable brackets is a worm meshing with the aforementioned rack. The shaft upon which this worm is mounted preferably extends under the floor to a point beyond the front edge of the seat and carries a ratchet wheel which is inserted in an opening through the floor in front of the seat. Journalled on the free end of this shaft adjacent the ratchet wheel is a lever normally lying in a slot in the floor in such a way as to lie flush or slightly below the level of the floor. Cooperating with this lever are a pair of pawls, each adapted to engage the ratchet wheel, one of which may be manipulated to lock the lever to the ratchet wheel for rotation of its attached shaft in one direction, while the other pawl may be manipulated to lock the ratchet wheel to the lever for permitting rotation of its attached shaft in the opposite direction. Accordingly, because of the rack and worm connection of the seat plate with the lever, an occupant may move the seat either backward or forward at will, merely by manipulating the pawls and the lever in the proper manner. Modified or alternative arrangements may exclude the flexible soft rubber body whereby the adjustable seat may be mounted directly above the surface of the floor, allowing only sufficient clearance to secure free backward and forward movement of the seat when it is being adjusted. Further details and modified arrangements are illustrated in the accompanying drawings, of which Figure 1 is a side elevation of the adjustable seat of this invention mounted upon the floor of a vehicle, as seen in cross-section along the line 1—1 of Fig. 4;

Fig. 2 is another cross-section of the seat as seen in elevation along line 2—2 of Fig. 4;

Fig. 3 is an enlarged vertical cross-section of the seat manipulating mechanism, as seen along the line 3—3 of Fig. 2;

Fig. 4 is a plan view of the entire seat mounting and adjusting mechanism with the seat removed;

Fig. 5 is a fragmentary longitudinal section of the seat taken along the line 5—5 of Fig. 4;

Fig. 6 is an enlarged transverse section of the flexible joint and the mounting therefor, as seen along the line 6—6 of Fig. 4;

Fig. 7 is an enlarged fragmentary longitudinal section of the same, as seen along the line 7—7 of Fig. 4;

Fig. 8 is a front view of an alternative arrangement of the adjustable seat without the flexible shock-absorbing joints;

Fig. 9 is a side elevation of the adjustable seat fitted with a modified form of a flexible shock-absorbing joint;

Fig. 10 is an enlarged, fragmentary, transverse section of this modified flexible joint and the sliding mounting of the seat as seen along the line 10—10 of Fig. 9;

Fig. 11 is a plan view of a modified or alternative form of the adjustable seat mounting; and Fig. 12 is an enlarged cross-section of the sliding mounting of the modified form of adjustable seat taken along the line 12—12 of Fig. 11.

In Figs. 1, 2, 4, 5, 6 and 7 of these drawings, numeral 20 generally designates the seat, which is preferably a self-contained unit having longitudinal cleats or bars 21 on the front and rear edges of its lower surface for the purpose of attaching mounting means or the like. The particular mounting means employed in the apparatus at hand includes brackets 22 secured to cleats or bars 21 by means of screws or the like, as shown particularly in Figs. 1, 2, 4 and 7. These brackets 22 are secured by bolts or rivets to clips 23 attached at their free ends by bolts 25 to a pair of curved channel-shaped members 24, and the clips 23 serve as spacers for the ends of these members 24, as seen particularly in Fig. 7. The members 24 enclose an annular soft rubber body 26 which is preferably made in two U-shaped parts, as seen in Fig. 1. In the center of this rubber body 26 are mounted four channel-shaped inner members 27 which together form an annulus in which the opposite sides of master plate or frame 28 are mounted and secured by rivets 29, as seen particularly in Fig. 6. The flexible rubber joint thus formed by the organization of parts 24, 26 and 27 constitutes in part the subject matter of my co-pending applications, Serial Nos. 187,156 and 187,157, both filed April 28, 1927. While this particular flexible rubber joint is preferred, it is to be understood that any other suitable flexible body or device, whether including soft rubber or not, may be applied with equal facility if desired.

In this connection, it may be stated that the channel-shaped members 27 which are secured on opposite sides of master plate 28 by means of rivets 29 and serve as seats for the soft rubber blocks 26, are preferably formed of sheet metal. These members 27 space the rubber blocks above and below the respective upper and lower surfaces of master plate 28 so that the oil or grease applied between rails 30 and 31 to lubricate the sliding contact between them and master plate 28 cannot engage the rubber. This is important for the reason that oil and grease slowly deteriorate rubber in time. These members 27 also serve the purpose of protecting the rubber mounted therein from heat, which also deteriorates rubber in time. The heat of steam pipes and the like on railway coaches, for example, is readily conducted by the metallic master plate or frame 28, but as the area of contact between members 27 and master plate 28 is small, the conduction of heat directly to the rubber through the metallic parts is small. Thus, members 27 are of primary importance to the operation and life of the rubber mounted therein.

The master plate or frame 28 is preferably made of sheet steel and extends longitudinally beneath the seat so that its opposite side edges project beyond the aforementioned flexible joints, as shown particularly in Figs. 4, 5 and 6. These extending edges of master plate 28 are slidably mounted for rectilinear movement in guide rails formed by super-imposed plates 30 and 31 secured together and to the floor 32 by means of wood screws 33, bolts, rivets or other fastening means. Sheet metal plate 28 is provided near its sliding edges with upturned integral ears 34, shown particularly in Figs. 4, 5 and 6, which are adapted to engage the edges of guide rails 30 and 31 to properly space master plate 28 therein and prevent binding of the edges thereof between the converging inner surfaces of rails 30 and 31. It will be seen that the master plate thus mounted is placed directly above the surface of the floor with only a small clearance space and is arranged for free sliding movement backward and forward in rails 30 and 31 arranged at either longitudinal edge thereof. Inasmuch as the seat 20 is mounted on the flexible joint 24—26—27, which in turn is mounted upon master plate 28 in the manner described, it is apparent that the seat as a whole may be moved backward and forward by moving master plate 28 in its rails 30—31. It is also apparent that the flexible joint 24—26—27, by virtue of its resiliency, allows the seat to move upwardly and downwardly and tilt backwardly and forwardly when occupied and that the soft rubber body 26 of this flexible joint is so arranged that it will absorb vibrations and shocks which may be transmitted thereto by vibrations of the automobile mechanism or because of road irregularities.

As shown particularly in Fig. 2, the center of the lower surface of master plate 28 is provided with rack teeth 35 which are preferably pressed, cut or otherwise formed therein, although a separate rack plate may be attached if desired. These rack teeth extend in the direction of the intended movement of the seat 20 and are located above an opening 36 in the floor 32. On the upper surface of master plate 28, directly above rack 25, is located a guide bar 37 secured at its opposite ends to the floor 32 under spacers 38, this guide bar being formed in channel cross-section as shown in Fig. 5 to allow for the upward curvature of the upper surface of master plate 28 at the rack 35 and serving to prevent deflection of the relatively thin master plate 28 at rack 35, whereby the master plate 28 is supported at these points, namely at its side edges and center. Guide bar 37 also serves as a stop against which the front and rear edges of master plate 28 engage to limit the forward and rearward adjustment of the seat as a whole.

Projecting upwardly through opening 36 in the floor board 32 directly beneath rack 35, so as to mesh therewith, is a worm 39, secured by screw 40, keyed or otherwise mounted upon the end of shaft 41 which lies directly below the floor 32 and is journalled in brackets 42 and 43 mounted upon the underside of the floor. The latter bracket, namely 43, is located a short distance in front of the edge of the seat 20, and adjacent an opening 44 in floor 32. Projecting through this opening 44 is a ratchet wheel 45 secured on the forward end of shaft 41. This ratchet wheel 45, worm 39, and shaft 41 are enclosed by a suitable sheet metal housing 46, secured to the underside of floor board 32. Similar housings 47 are mounted on the under side of floor board 32 so as to enclose and thus protect the flexible joint 24—26—27, which extends through and beneath the floor 32.

Freely journalled on the end of shaft 41 so as to embrace ratchet wheel 45 is the bifurcated lever 48, which is normally arranged to lie in a slot 49 so as to lie flush with or below the upper surface of floor 32. The free end of lever 48 is fitted with a soft rubber friction collar 50 or the like, which frictionally engages the side walls of slot 49, as shown particularly in Fig. 3 to hold the lever in place and prevent displacement, rattling, and the like.

Pivoted upon the shaft end of lever 48 are a pair of pawls 51 and 52 which extend slightly above the surface of the floor 32 but are protected against injury by a pair of guards 53 secured to the top of the floor 32 at the front and rear edges of opening 44, as shown particularly in Fig. 3. Each of these pawls 51 and 52 is arranged for two positions, one in engagement with ratchet wheel 45 and the other out of engagement with this ratchet wheel. In order to hold pawls 51 and 52 in each of these two positions when they are moved into either position, a spring 54 is located between them and engages flat surfaces thereon which are arranged to cooperate with the spring for holding the pawls 51 and 52 in the two positions mentioned. As shown in Fig. 3, the inner edges of the tips of each of these pawls 51 and 52 are curved so as to slip over the teeth of ratchet wheel 45 when moved in the direction of this curve, but these tips are arranged to lock in the teeth of ratchet wheel 45 to rotate the same when their pawls are moved in the opposite direction. Accordingly, when pawl 51 is in engagement with ratchet wheel 45, while pawl 52 is disengaged therefrom ratchet wheel 45 is rotatable in a counter-clockwise direction. Conversely, when pawl 52 is in engagement with ratchet wheel 45, while pawl 51 is disengaged therefrom, ratchet wheel 45 is rotatable in a clockwise direction when lever 48 is manipulated. It will be seen that operation of ratchet wheel 45 in either direction rotates its attached shaft 41 and the attached worm 39 which cooperates with rack 35 to move master plate 28 and its attached seat either forward or backward depending upon which one of pawls 51 or 52 is in engagement with ratchet wheel 45. Specifically, when pawl 51 is engaged with ratchet wheel 45, seat 20 will be moved forward when lever 48 is manipulated and when pawl 52 is in engagement with ratchet wheel 45, seat 20 will move backward when lever 48 is manipulated. If neither of the pawls 51 or 52 engages ratchet wheel 45, the manipulation of handle 48 will have no effect. If both pawls 51 and 52 are engaged by ratchet wheel 45, manipulation of lever 48 will only have the effect of moving the seat backward and forward the same amount. Accordingly, the device is fool proof and cannot get out of order because of misuse. For convenience to the operator, pawl 51 may be marked "Forward" and pawl 52 marked "Backward" so that by manipulating either of them according to directions, the desired result will be obtained when lever 48 is operated.

In the alternative arrangement of Fig. 8, the master plate or frame 28' is mounted at either edge for sliding movement in guide rails 30' and 31', this movement being obtained in the manner described by worm 39' engaging rack 35' pressed in master plate 28' guided by bar 37'. The flexible joints, however, are omitted and the seat 20' is mounted directly upon master plate 28' by bolts 55 passing through cleats or bars 56 secured in any suitable way to the underside of seat 20'. By comparing Fig. 8 with Fig. 5, it will be seen that seat 20' may be placed closer to the floor for the reason that the interposed flexible joint is omitted and no clearance for allowing backward and forward tilting movement permitted by the flexible joint is necessary.

The modification shown in Fig. 9 differs from that shown in Figs. 1 to 7, inclusive, in that a different flexible joint is employed. In this arrangement the clips 22" secured to cleats or bars 21" are connected directly to a channel-shaped plate 57 which forms the upper element of the flexible joint. The lower element 58 of the flexible joint is similar to the upper element 57, and between these elements are mounted the four flexible bodies 59, which are preferably soft rubber bodies held in place at their ends by channel-shaped washers 60, between which pass the bolts and spacers 61, which also secure upper and lower members 57 and 58 together. The master plate 28" is inserted between the upper and lower parts of rubber bodies 59 which are seated in central channel-shaped members 62, and which are riveted together and to master plate 28", as shown particularly in Figs. 9 and 10. It will be apparent that this arrangement provides an inexpensive and extremely simple method of introducing shock-absorbing bodies in the adjustable seat of this invention without taking up much space.

In Figs. 11 and 12 is illustrated a modified form of the adjustable seat without the resilient shock-absorbing bodies interposed between the seat and the sliding support therefor. As shown in these drawings, seat 20''' is provided with lateral angles 63 whose flanges project inwardly. The under surface of the seat 20''' is undercut at the inner edges of flanges 63 so as to provide a space for rails 64 and 65, the rail 64 lying directly upon the upper surface of the floor 32''', while rail 65 overlaps the inner edge of flange 63 so that the latter is guided on its top and bottom surfaces between rails 64 and 65, both of which are secured to the floor 32''' by means of wood screws 66, bolts, rivets or the like. With this arrangement, it will be seen that seat 20''' is slidable forward and backward to a degree limited by stop members, to be described later. In order to prevent binding of the flanges 63 between rails 64 and 65 and to prevent lateral displacement of the seat as a whole, upturned ears 67 formed integrally with flanges 63 are provided, and these ears engage the outer edge of rail 65 as flange 63 slides between rails 64 and 65.

Spanning the under side of seat 20''', from front to rear, is a bar 68 of sheet metal, on the under surface of which is formed the rack 35''' in much the same way that the similar rack is formed on plates 28 and 28' of the modifications shown in Figs. 5 and 8, respectively. That is to say, the teeth forming rack 35''' are pressed or rolled in the lower surface of bar 68. Meshing with this rack and journalled beneath the floor 32'''' is the worm 39''' mounted upon shaft 41''' in the manner previously described. It is not necessary that the details of this worm and its shaft be further described, and they are indicated in phantom in Fig. 11, where the arrangement will be understood in connection with the previous description. Bar 68 is provided with apertures 69 through which the opposite ends of guide bar 70 are inserted and secured to floor board 32''' by means of screws, bolts, rivets or the like. This guide bar 70 corresponds to guide bar 37 shown in Figs. 4 and 5 and serves the same purpose. The ends of this bar 70 also provide stops, limiting the forward and backward movement of the seat 20''' as it is driven by the lever connected to shaft 41'''. The arrangement of Fig. 11 allows free access to the floor at A and B in which traps for a tool box or battery may be provided, if desired.

The new adjustable seat of this invention provides many advantages over those heretofore employed, and may be installed on vehicles and in particular automobiles as they are now constructed without interfering with the other mechanism. For example, the supports for the seat lie practically flush with the floor and may be installed when the floor is emplaced. Because of this low-built arrangement, the emplacement and removal of the body from the chassis of the automobile is not interfered with in any way. The standard seats may be mounted upon the adjustable mechanism and are placed and arranged in much the same way that seats are now placed and arranged. All of the metallic elements, except possibly the worm, may be stamped from sheet metal and formed in one operation, whereby great strength, lightness and economy are obtained. The operating mechanism lies below the surface of the floor and may be installed on standard floor boards merely by cutting the required holes and notches in these boards. Accordingly, it is apparent that the seat may be mounted close to the floor, allowing only sufficient clearance to permit movement of the seat over the surface of the floor board during the time that it is being adjusted.

If the flexible joints are employed, sufficient clearance is allowed to permit limited tilting of the seat backward and forward in response to the movements and weight of the occupant. Even when the flexible joints are employed, the seat may be mounted very close to the floor so that it conforms to the present tendencies of automobile manufacturers to construct vehicles which are generally low and built close to the ground. Moreover, this low arrangement of the seats permits full vision through the windshield or windows and does not in any way interfere with the driving facilities of the automobile. In fact, by making the front seats of the automobile adjustable as described in this invention, the operator can himself arrange the seat with respect to the foot pedals and steering wheel so as to secure greater driving facility and comfort commensurate with his own desires.

While certain preferred embodiments of the invention have been illustrated and described herein, it is to be understood that these embodiments are susceptible of extensive modifications, variations, and substitutions within the full scope of this invention.

I claim:

1. In an adjustable seat, the combination of a support, a plurality of parallel rails mounted upon said support, a frame carrying the seat and mounted upon said rails for movement therealong, a rack formed upon the under side of said frame, a worm journalled in said support and meshing with said rack, a shaft mounting said worm extending beneath said support, a crank journalled upon said shaft and projecting upwardly through said support for movement above the same, and an adjustable pawl arranged for connecting said shaft and crank at will whereby manipulation of said crank adjusts the position of said seat upon said rails.

2. In an adjustable seat, the combination of a support therefor, means for movably mounting the seat on the support, cooperating parts for effecting movement of the seat relative to the support and non-metallic resilient means interposed at a point intermediate the longitudinal extremities of the seat in supporting relationship between the seat and the support, whereby the seat may have a limited longitudinal rocking movement on said support.

3. In an adjustable seat, the combination of a support, guide rails upon said support and means mounting said seat for movement therealong, a rack mounted on said seat, a worm journalled on said support and meshing with said rack, a shaft mounting said worm and extending at least to one outer edge of said seat, a crank mounted on said shaft for rotating the same to adjust the position of said seat on said rails at will, and a non-metallic resilient body interposed in supporting relationship between the seat and each guide rail.

4. In an adjustable seat, the combination of a support, a plurality of parallel rails mounted upon said support, a frame carrying the seat, a plurality of non-metallic flexible members supporting said frame and mounted upon said rails for movement therealong, a rack formed upon the under side of said frame, a worm journalled in said support and meshing with said rack, a shaft mounting said worm extending beneath said support, a crank journalled upon said shaft and projecting upwardly through said support for movement above the same, and an adjustable pawl arranged for connecting said shaft and crank at will whereby manipulation of said crank adjusts the position of said seat upon said rails.

5. In an adjustable seat, the combination of a support, at least two parallel rails mounted upon said support, a frame mounted for sliding movement upon said rails, a plurality of non-metallic flexible bodies embracing said frame, a seat mounted upon said non-metallic flexible bodies, screw threads on said frame, a screw mounted upon said support and meshing with said screw threads, and means for rotating said screw to adjust the position of said seat along said rails.

6. In an adjustable seat, the combination of a support, at least two parallel horizontal rails mounted upon said support, a frame mounted for forward and backward sliding movement upon said rails, a set of channel-shaped members secured to opposite sides of said frame, a second set of channel-shaped members mounted upon the seat in the vertical plane of said first members and spaced therefrom, and rubber bodies mounted in the spaces formed between the members of both sets.

7. The combination of a seat, a floor upon which the seat is adjustably supported, a shaft located below the floor-level, connections between the seat and said shaft whereby rotary movement of the shaft effects adjusting movement of the seat, and an oscillatory actuating lever operatively connected to the shaft, the floor having an opening to accommodate the lever and the upper edge of said lever being no higher than the surface of the floor.

8. The combination of a seat, a support, a frame on which the seat is mounted, guide means on the support at each end of the frame permitting sliding movement of the frame relative to the support, an actuating worm below the frame, the frame having teeth cooperating with the worm, and restraining means extending across a portion of the frame in the vicinity of the worm to prevent upward movement of the toothed portion of the frame away from the worm during rotation of the worm.

9. An adjustable seat for automobiles comprising a frame to which the seat is secured and which is mounted on the floor of the automobile so as to slide relative thereto, an actuating shaft located below the level of the floor surface, connections between said frame and shaft to effect sliding movement of the frame when the shaft is rotated, the floor being provided with an opening adjacent the end of the shaft, and an actuating lever for said shaft operable in a sector of a circle extending above the level of the floor and through said opening.

10. An adjustable seat for automobiles comprising a frame to which the seat is secured and which is mounted on the floor of the automobile so as to slide relative thereto, an actuating shaft located below the level of the floor, connections between said frame and shaft to effect sliding movement of the frame when the shaft is rotated, the floor being provided with an opening adjacent the end of the shaft, and an actuating lever connected to said shaft, the lever being operable through a sector of a circle extending through said opening and above the level of the floor, and reversible ratchet mechanism between said lever and said shaft.

11. In an automobile, a movable support for a seat mounted upon the floor thereof, a rack carried by said movable support, a shaft rotatably mounted beneath said floor, a worm rigidly mounted upon said shaft and extending through an opening in the floor into engagement with said rack, and reversible ratchet means for rotating said shaft.

12. In an adjustable seat, the combination of a support, two oppositely disposed substantially parallel guides on said support, said guides each comprising an upper and a lower plate and a space therebetween, a sheet metal frame having flat ends mounted in the spaces between the guide plates whereby the frame is slidably supported by the guides, and a seat carried by the frame, said frame having at least two integral projections struck therefrom near each end thereof and engaging with the inner edge of the corresponding guide plate, said projections being spaced apart in the direction of movement of the frame and being so disposed as to prevent the binding of the frame in the spaces between the guide plates.

In testimony whereof I affix my signature.

GERHARD FLINTERMANN.